(12) United States Patent
Janes et al.

(10) Patent No.: US 11,639,728 B2
(45) Date of Patent: May 2, 2023

(54) SPOOL VALVE AND PISTON GEOMETRY TO REDUCE CAVITATION EFFECTS IN A LINEAR ACTUATOR

(71) Applicant: Resonance Technology International Inc., New Westminster (CA)

(72) Inventors: Matthew C. Janes, New Westminster (CA); Douglas Dane Reelie, Langley (CA)

(73) Assignee: RESONANCE TECHNOLOGY INTERNATIONAL INC., New Westminster (CA)

( * ) Notice: Subject to any disclaimer, the term of this patent is extended or adjusted under 35 U.S.C. 154(b) by 454 days.

(21) Appl. No.: 16/841,486

(22) Filed: Apr. 6, 2020

(65) Prior Publication Data

US 2020/0318657 A1    Oct. 8, 2020

Related U.S. Application Data

(60) Provisional application No. 62/830,502, filed on Apr. 7, 2019.

(51) Int. Cl.
*F15B 13/04* (2006.01)
*F16K 31/06* (2006.01)
(Continued)

(52) U.S. Cl.
CPC ...... *F15B 13/0402* (2013.01); *F15B 15/1447* (2013.01); *F16K 11/0712* (2013.01);
(Continued)

(58) Field of Classification Search
CPC ................ F15B 13/0402; F15B 13/406; F15B 15/1447; F15B 15/202; F15B 15/149; F15B 2211/7054; F15B 2211/8609; F15B 2211/7733; F16K 11/0712; F16K 31/0689; F16K 47/02; B06B 1/183
See application file for complete search history.

(56) References Cited

U.S. PATENT DOCUMENTS 2,970,570 A    2/1961  Hill
3,678,803 A  *  7/1972  Schwenzfeier ......... B06B 1/183
                                                91/39
(Continued)

FOREIGN PATENT DOCUMENTS

WO    WO2011087080    7/2011

*Primary Examiner* — Patrick C Williams
(74) *Attorney, Agent, or Firm* — Madson IP, P.C.

(57) ABSTRACT

A linear actuator system has a rotary spool valve configuration having a spool, a piston, and a cylinder. The spool and piston have return apertures so positioned, configured and angled to direct return flow towards the center of a spool central return port and spool pressure ports to direct pressurized flow into upper or lower chambers. Rotation of the spool synchronizes and aligns ports and apertures to reverse flows and effect upward and downward translation of the cylinder to vibrationally drive an implement to perform work. The positioned and angled apertures direct the fluid to a region demarcated by a total length of 1.5 times the interior diameter of the spool central return port centered about a piston shoulder. A base plug member having a bull-nose tip, baffles and cavities is disposed within the spool central return port to reduce or eliminate cavitation.

20 Claims, 3 Drawing Sheets

(51) Int. Cl.
*F16K 47/02* (2006.01)
*F16K 11/07* (2006.01)
*F15B 15/14* (2006.01)

(52) U.S. Cl.
CPC .......... *F16K 31/0689* (2013.01); *F16K 47/02* (2013.01); *F15B 2211/7054* (2013.01); *F15B 2211/8609* (2013.01)

(56) References Cited

U.S. PATENT DOCUMENTS

| | | |
|---|---|---|
| 4,092,903 A | 6/1978 | Allmer |
| RE32,995 E * | 7/1989 | Fair .................. G01V 1/155 |
| | | 181/114 |
| 5,136,926 A | 8/1992 | Bies et al. |
| 5,974,800 A | 11/1999 | Scheidl et al. |
| 7,162,944 B2 | 1/2007 | Britz |

* cited by examiner

SPOOL VALVE AND PISTON GEOMETRY TO REDUCE CAVITATION EFFECTS IN A LINEAR ACTUATOR

RELATED APPLICATION

This patent application claims the benefit of U.S. Provisional Patent Application, Ser. No. 62/830,502 that was filed on Apr. 7, 2019, for an invention titled SPOOL VALVE AND PISTON GEOMETRY TO REDUCE CAVITATION EFFECTS IN A LINEAR ACTUATOR, which is hereby incorporated herein by this reference as if recited in its entirety.

TECHNICAL FIELD

The present invention relates generally to hydraulic spool valves controlling cyclic flow reversal. More specifically, the present invention relates to a hydraulic spool valve used for rapid-flow cycling in a hydraulic system with combined flow rates and pressure differentials to induce cavitation effects. Cavitation is a devastating problem that may result in rapid wear and degradation of hydraulic components. High speed flow reversals and pressure differentials generate conditions that are at a high risk of sustaining cavitation damage.

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "some embodiments," "various embodiments," and the like, may indicate that the embodiment(s) of the invention so described may include a particular structure, feature, property, or characteristic, but not every embodiment necessarily includes the particular structure, feature, property, or characteristic. Further, repeated use of the phrase "in one embodiment," or "in an exemplary embodiment," does not necessarily refer to the same embodiment, although they may.

BACKGROUND

Many hydraulic applications require rapid-flow reversals which are accomplished using servo or spool valves to redirect fluid from one direction or port to another. At low-flow rates or pressure differentials this task is accomplished easily using conventional servo and spool technology. As the flow rates and pressure differentials increase, this task becomes challenging both in terms of generating efficient flow regimes and in preventing cavitation.

For example, current servo and spool technology, at frequencies above 50 Hz and flow rates above 300 liters per minute, typically experience a combination of poor efficiency (high heat production), noisy valve performance (poor harmonics and non-sinusoidal flow regimes), poor frequency response (slow valve opening) and high cavitation of the valve and downstream hydraulic component materials.

Further, servo and spool valves typically comprise a cylindrical valve element housed within a precisely machined bore with very small annular gaps between the two. The small annular gaps act as, or assist, in sealing the high-and-low pressure environments from one another. In larger valves capable of flow rates above 300 liters per minute, the tolerances and clearances make it difficult to achieve an effective seal.

Such a system is described in U.S. Pat. No. 5,136,926 issued to Bies et al. ("Bies"). The system described uses a rotating spool valve with axial grooves to deliver pressurized fluid medium to the linear piston cylinder system and a central return cavity to return the spent fluid to the source for recirculation as pressurized fluid.

Bies teaches a valve with radially distributed and positioned porting, having axial grooves used as distribution chambers for the pressurized fluid situated immediately adjacent to the return porting. Such a geometry relies upon a journal-type seal, or simply a tight tolerance resulting in a narrow annulus, to deter high-pressure fluid medium from leaking from the high-pressure region to the low-pressure, return flow, region. The valve geometry taught by Bies results in a short-circumferential sealing area between the pressure and return circuits. In addition, the long axial grooves for delivery of the pressurized fluid results in a broad valve edge with increased leakage path potential and decreased efficiency.

Further, as the valve rotates, the sealing annular path between the pressure and return circuits reduces significantly, resulting in high leakage rates as the valve is about to open or shortly after valve closure. Such leakage may represent 40% or more of the total flow of the system with resulting high losses and inefficiency.

It will also be appreciated that when using presently available systems, at higher pressures and flow rates, the stop/start cyclic flow regime may result in rapidly reducing pressures followed by rapidly increasing pressures, which increase the risk of cavitation. As flow rates and pressure differentials increase, the potential for cavitation increases as well. With rapid flow interruption or reversals, hydraulic hammer effects can take place which contribute significantly to cavitation.

Porting geometries and flow velocities also influence cavitation potential. These effects have been studied and tested by the inventors resulting in advances made in the understanding of how geometry may influence and reduce cavitation potential.

Accordingly, a need exists for a new system and method for rapid flow switching spool technology that addresses one or more known problematic issues. Specifically, a new system and method is needed that will allow for high flow rate and pressure differential flow switching with high efficiency that reduces or eliminates cavitation of the host materials. Such systems and methods are disclosed herein.

SUMMARY OF THE INVENTION

The exemplary embodiments of the present disclosure have been developed in response to the present state of the art, and in particular, in response to the problems and needs in the art that have not yet been resolved fully by currently available hydraulic servo or spool valves.

A fluid driven piston/cylinder system may be configured to act as an uni-axial, high-frequency (above 30 Hz) vibrator using an internal spool valve. Fluid is directed by a spool valve above or below a shoulder mounted on either the piston or the cylinder to generate axial movement. Such axial movement, reacting against a mass, will generate cyclic, axial motion and force.

It is desirable to separate the pressure and return circuits to avoid backward and forward shuttling of flow, which requires energy to move the mass of fluid and causes heat accumulation as the fluid is not replenished with new, cooled fluid.

The exemplary embodiments of the current invention alter significantly the geometry of the spool valve porting and flow paths to increase efficiency and to reduce cavitation potential. In summary, the spool valve features: 1) pressure and return port separation; 2) isolated pressure porting; 3) spool valve return port location and projection; and, 4) spool interior baffling that dissipates pressure pulses to specifically address, reduce, or eliminate the conditions that cause cavitation.

Cavitation may be caused by stress waves emanating from a rapidly collapsing bubble in high-pressure hydraulic fluids (such as hydraulic oil). Two events must occur to generate cavitation causing stress waves: 1) bubbles must form in the hydraulic fluid in a low-pressure environment, and 2) the bubbles must collapse rapidly in a high-pressure environment. Thus, cavitation may be prevented by eliminating the bubbles that lead to cavitation or by preventing the bubbles from collapsing rapidly, or by some combination thereof.

Separation of the pressure and return ports reduces system leakage from high to low pressure. A highly cyclic pressure regime may result in pulsing flows within these annular gaps. Separation of the porting reduces the opportunity to generate pulsing flows that may lead to cavitation. In addition, the separation reduces leakage volume and enhances efficiency. Separation of the pressure and return ports may be achieved by re-locating the pressure porting axially along the valve to the top and bottom of the cylinder chamber and maintaining the return porting towards the center of the cylinder assembly, at the other end of each chamber.

Return port location and geometry strongly influences cavitation potential. Correct selection of port sizing and orientation of the return flow path may reduce cavitation potential significantly.

The central spool return porting tends to be long with respect to the spool diameter. High frequency flow switching and dynamic vibrator loading, from the work or implement the linear vibrator is mobilizing, may result in very high return cylinder cavity pressures at the moment the return valve opens. High pressures within the return cylinder cavity and low return spool porting results in immediate, high pressure pulses and flow rates within the partially open valve. Such high-pressure pulses can result in stress wave propagation and reflection within the central, long valve port. Stress wave reflection and superposition at the valve ends can develop high, rapidly changing pressures with the consequence of high cavitation potential and damage. Such stress waves are worsened by axial separation of the return ports, which may be desirable in order to maintain port location on either side of the piston or cylinder shoulder. Separation of the return ports results in two locations of stress pulses which are separated in time by the period of vibration.

Further, the return flow possesses mass; and thus, momentum when flowing out of the valve. As the lower port closes, the momentum of the flow column away from the lower valve generates a low pressure or vacuum condition that is more susceptible to bubble formation. With the onset of the upper return valve opening under high pressure, the resulting high-pressure stress wave and superposition at the lower valve plug results in bubble collapse and higher cavitation power and damage.

Clustering the return ports within the same region and angling the ports to a common target within the spool central return port results in a reduction of the flow momentum and a resulting reduction in vacuum or low-pressure events. The subsequent opening of the upper return valve, which occurs as soon as the lower return valve closes, feeds fluid medium (hydraulic oil) immediately into the potentially low-pressure region.

Introduction of a spool end plug, featuring a bullnose and/or porting with a plethora of baffles will dissipate any stress waves traveling within the valve central return port.

These and other features of the present disclosure will become more fully apparent from the following description, or may be learned by the practice of the invention as set forth hereinafter.

BRIEF DESCRIPTION OF THE DRAWINGS

The exemplary embodiments of the present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are representative and are provided so that this disclosure will be operative, enabling, and complete. Accordingly, the particular arrangements disclosed are meant to be illustrative only and not limiting the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Understanding that these drawings depict only exemplary embodiments and are, therefore, not to be considered limiting of the invention's scope, the exemplary embodiments of the invention will be described with additional specificity and detail through use of the accompanying drawings in which.

Figure 1:
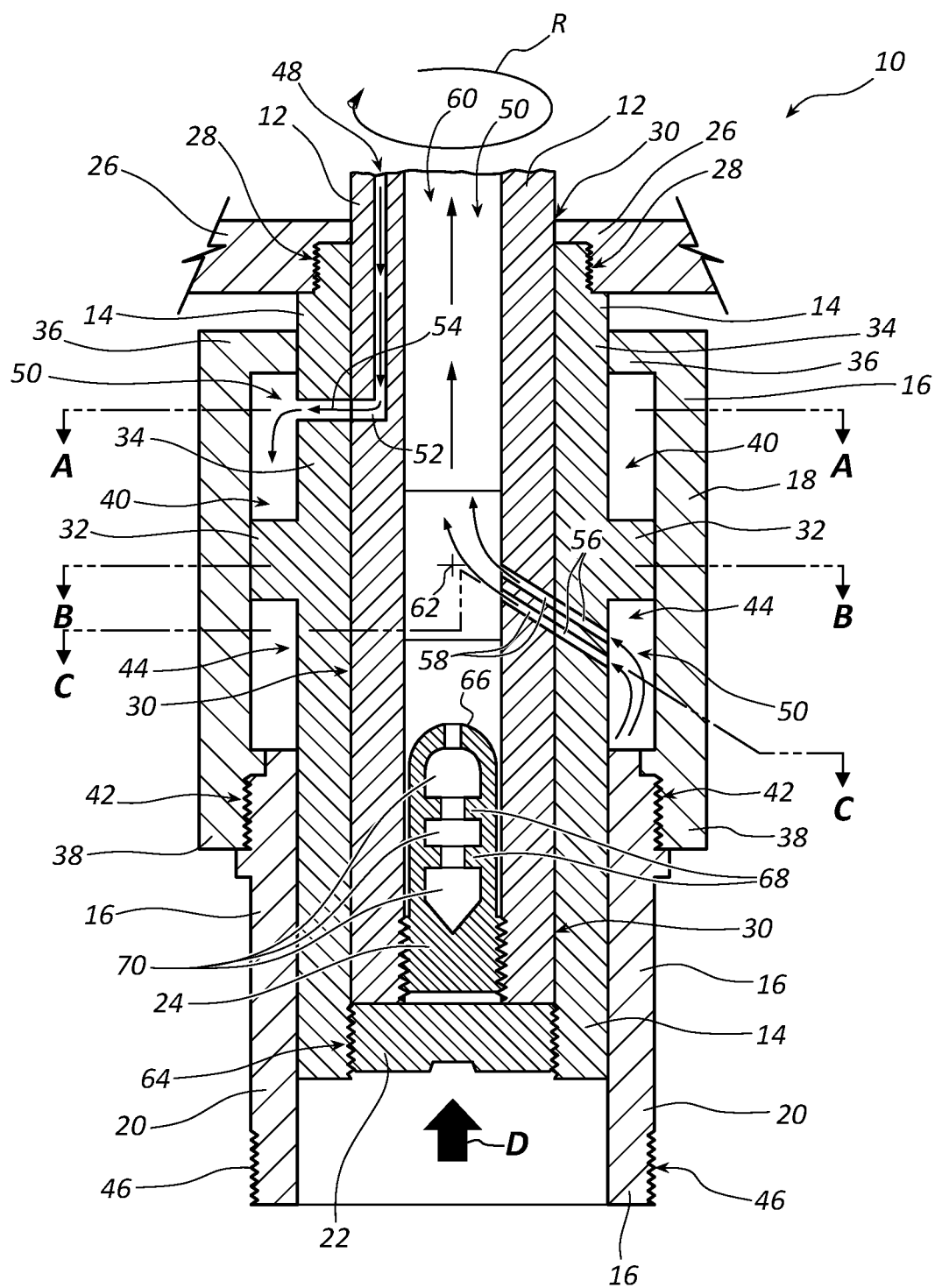
FIG. 1 depicts an exemplary embodiment of a linear actuator system (sometimes also referred to as a linear vibrator) of the present invention in vertical section view through the center of the device showing the spool valve rotated into the position filling the upper chamber of the linear actuator or vibrator, driving the cylinder upward; and thus, raising the implement during a first cycle of the vibration.

REFERENCE NUMERALS linear actuator system 10
spool 12
piston 14
cylinder 16
upper cylinder member 18
lower cylinder member 20
spool bulkhead 22
base plug member 24
(rotation) Arrow R
backing mass 26
piston anchorage 28
gap 30
shoulder 32
(piston) body 34
enclosed end 36
closing end 38
upper chamber 40
cylinder coupling 42
lower chamber 44
implement coupling 46
spool pressure port 48
fluid medium 50
spool pressure aperture 52
piston pressure aperture 54
piston return aperture(s) 56
spool return aperture(s) 58
spool central return port 60
(direction) Arrow D
midpoint 62
plug anchorage 64
bull-nose tip 66
baffle(s) 68
cavity(ies) 70

DETAILED DESCRIPTION

The exemplary embodiments of the present disclosure will be best understood by reference to the drawings, wherein like parts are designated by like numerals throughout. It will be readily understood that the components, and their equivalents, of the present invention, as generally described and illustrated in the Figures herein, could be arranged and designed in a wide variety of different configurations. Thus, the following more detailed description of the exemplary embodiments, as represented in the Figures, is not intended to limit the scope of the invention, as claimed, but is merely representative of exemplary embodiments of the invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list. Additionally, the terms "operator", "user", and "individual" may be used interchangeably herein unless otherwise made clear from the context of the description.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

In this application, the phrases "connected to", "coupled to", and "in communication with" refer to any form of interaction between two or more entities, including but not limited to mechanical, capillary, electrical, magnetic, electromagnetic, pneumatic, hydraulic, fluidic, and thermal interactions.

The phrases "attached to", "secured to", and "mounted to" refer to a form of mechanical coupling that restricts relative translation or rotation between the attached, secured, or mounted objects, respectively. The phrase "slidably attached to" refer to a form of mechanical coupling that permits relative translation, respectively, while restricting other relative motions. The phrase "attached directly to" refers to a form of securement in which the secured items are in direct contact and retained in that state of securement.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when attached directly to each other from a single work piece. Thus, elements that are "coupled to" each other may be formed together as a single piece.

FIG. 1 depicts an exemplary embodiment of a linear actuator system 10 having spool valve and piston geometry designed to reduce cavitation effects within the system 10. The linear actuator system 10 comprises a spool 12, a piston 14, a cylinder 16 having an upper cylinder member 18 and a lower cylinder member 20, a spool bulkhead 22, and a base plug member 24. The spool 12 is rotated (as shown by Arrow R) by an external source (not shown, but known by those skilled in the art) mounted to a supporting housing (not shown) or dominant mass (such as backing mass 26). In this example, the piston 14 is fixedly connected to the backing mass 26, via a piston anchorage 28 (a threaded or any other suitable connection). The backing mass 26 acts as a reaction mass against which the linear actuator 10 will pull, as for every action there is an equal and opposite reaction. The spool 12 rotates freely within the piston 14 with a narrow annular gap 30 (spacing of the gap 30 is not shown for overall clarity due to relative dimensions) between the two. Such narrow gap 30 effects a seal whose efficiency is based upon the length and width of the annular area or space. Piston 14 also has a shoulder 32 extending outward from the body 34 of the piston 14.

It should be understood that in an alternative exemplary embodiment, the cylinder 16 may have a shoulder 32 similar to, and in lieu of, the shoulder 32 connected to and extending from the piston 14 as depicted in the drawings.

Although the linear actuator system 10 is described herein such that the system 10 has a longitudinal axis that extends vertically, it should be understood that the linear actuator system 10 need not necessarily operate in a vertical disposition. However, to simplify this disclosure a vertical disposition is described and terms such as "upper", "lower", "upward", and "downward" are used to facilitate understanding the invention, but may not otherwise technically be accurate if the linear actuator system 10 were not oriented vertically. Hence, the use of such directional terms in the claims should not be limited to a vertical disposition, but should be interpreted as if the system 10 were oriented vertically.

The cylinder 16 slidably engages both the body 34 of piston 14 and the shoulder 32. The upper cylinder member 18 has an enclosed end 36 and a closing end 38, wherein the upper cylinder member 18 and its enclosed end 36, together with the body 34 of piston 14 and its shoulder 32 forms an upper chamber 40 having an expandable/contractable volume. The closing end 38 of upper cylinder member 18 is attached fixedly to the lower cylinder member 20, via a cylinder coupling 42 (a threaded or any other suitable connection). The upper cylinder member 18 and connected lower cylinder member 20, together with the body 34 of piston 14 and its shoulder 32 forms a lower chamber 44 having an expandable/contractable volume. Lower cylinder member 20 extends below the piston 14 and may be connected fixedly to some implement (not shown, but working implements such as clamps, piles, drill bits, chisels and the like are known to those skilled in the art) via an implement coupling 46 (a threaded or any other suitable connection).

The spool 12 is ported (referred to herein as spool pressure port 48) to permit a high-pressure fluid medium 50 to flow from the rotatable spool 12 through spool pressure aperture 52 and communicating through the piston 14 via piston pressure aperture 54, into the upper chamber 40 (as depicted by directional flow indicator arrows define fluidic communication between the referenced passages and such directional arrows are not numbered so to differentiate non-flow and lead-line arrows). It is to be noted, the spool pressure port 48 is enclosed within the body of the spool 12, via rifle bore or similar method, and is not an annular passageway formed by a groove or other means between the outer diameter of the spool 12 and the inner diameter of the piston 14. Simultaneously, lower chamber 44 communicates through piston return aperture(s) 56 and spool return aperture(s) 58 to release low-pressure fluid medium 50 from within lower chamber 44 into the spool central return port 60 and back to the power medium source (not shown, but known to those experienced in the art) and sometimes referred to herein as the fluid-pressurizing source. The rotation of spool 12 is timed or synchronized to open and close the spool pressure aperture 52 and piston pressure aperture 54 and the spool return aperture(s) 58 and piston return aperture(s) 56, respectively, such that the introduction of pressurized fluid medium 50 into the upper chamber 40 is simultaneous, or nearly so, with the evacuation of the lower chamber 44. The pressurized flow of the fluid medium 50 into upper chamber 40 taken together with the evacuation of fluid medium 50 from lower chamber 44, forces the cylinder 16 upward and thus spool bulkhead 22 upward in the direction depicted by Arrow D.

The spool return aperture(s) 58 and piston return aperture(s) 56 are located, positioned through their respective spool 12 and piston 14 member bodies such that the discharge into the central return port 60 of the spool 12 within 1.5 times the internal diameter of the central spool return port 60 centered on the midpoint 62 of the shoulder 32. Further, spool return aperture(s) 58 and piston return aperture(s) 56 are angled within the respective spool 12 and piston 14 member bodies such that the discharge is directed towards the central spool return port 60 and the midpoint 62 of the shoulder 32.

For purposes of this disclosure, the term "midpoint" is a small region in the near vicinity to where the center-transverse plane of the shoulder 32 intersects the longitudinal axis of the linear actuator system 10 (the spool 12 has the same longitudinal axis). Also, it should be understood that the cylinder 16 may have a shoulder 32 similar to, and in lieu of, the shoulder 32 connected to and extending from the piston 14 as depicted in the drawings. With a shoulder 32 extending from the cylinder 16 and the piston 14 having an enclosing end and a closing end, the functionality of the linear actuator system 10 would be the same. Certainly, those skilled in the art, armed with this disclosure, will know how to fashion a shoulder 32 extending inwardly from the body of the cylinder 16, separating upper chamber 40 and lower chamber 44, and together with the piston 14 having an enclosing end and a closing end would define the expandable/contractable upper chamber 40 and lower chamber 44.

The base of the spool 12 is fitted with a base plug member 24 fixedly attached to the spool 12 at plug anchorage 64 by threaded or any other suitable connection. In another exemplary embodiment, the base plug member 24 may be fixedly attached to the spool bulkhead 22 or the piston 14.

The spool base plug member 24 may feature a bull-nose tip 66 and one or more small diameter baffles 68 to permit the passage of fluid medium 50 pressure waves and/or flow (as a result of fluid medium 50 compression within the interior of the body of the base plug member 24) to enter into a series of expanded cavities 70 within the body of the base plug member 24. The effect of the baffles 68 and cavities 70 is to dissipate both the stress waves and flow, thereby reducing or eliminating cavitation.

Figure 2:
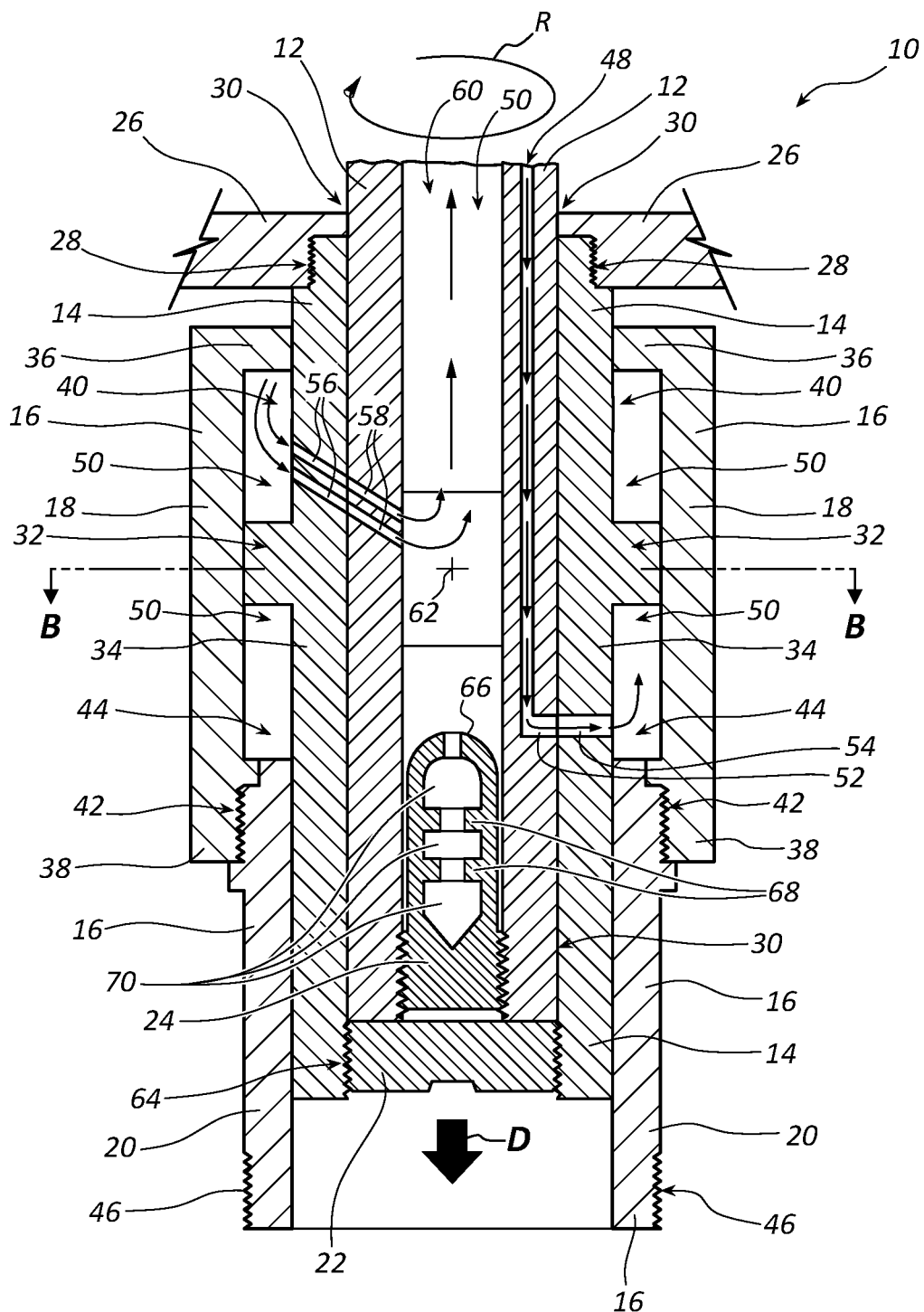
FIG. 2 depicts the exemplary embodiment of the linear actuator system of FIG. 1, again in a vertical section view through the center of the device showing the spool valve rotated into the position filling the lower chamber of the linear actuator or vibrator, driving the cylinder downward; and thus, lowering the implement in the next cycle of the vibration.

FIG. 2 depicts the exemplary embodiment of the linear actuator system 10 when the rotatably attached spool 12 has rotated one valve progression (for example, 60 degrees clockwise in a three-ported valve configuration) positioning the spool 12 to translate the cylinder 16 and the upper cylinder member 18 as connected to the lower cylinder member 20 downwards as depicted by directional Arrow D. The vertical section is cut along the central axis but rotated 60 degrees clockwise (see Arrow R) to depict the valve communication for a downward translation.

As depicted in this embodiment, the piston 14 is connected fixedly to the backing mass 26, via piston anchorage 28. Again, the backing mass 26 acts as a reaction mass against which the linear actuator 10 will push, as for every action there is an equal and opposite reaction. The spool 12 rotates freely within the piston 14 with the narrow annular gap 30 between the two. As discussed above regarding FIG. 1, the narrow gap 30 effects a seal whose efficiency is based upon the length of and width of the annular area or space.

Cylinder 16 is connected slidably to the piston 14. The upper cylinder member 18 has an enclosed end 36 and a closing end 38, wherein the upper cylinder member 18 and its enclosed end 36, together with the body 34 of piston 14 and its shoulder 32 forms an upper chamber 40 having an expandable/contractable volume. The closing end 38 of upper cylinder member 18 is attached fixedly to the lower cylinder member 20, via a cylinder coupling 42. The upper cylinder member 18 and connected lower cylinder member 20, together with the body 34 of piston 14 and its shoulder 32 forms a lower chamber 44 having an expandable/contractable volume. Lower cylinder member 20 extends below the piston 14 and may be connected fixedly to some implement (not shown, but working implements such as clamps, piles, drill bits, chisels and the like are known to those skilled in the art) via the implement coupling 46.

The spool 12 is ported, having another spool pressure port 48 positioned 60 degrees clockwise from spool pressure port 48 shown in FIG. 1, to permit a high-pressure fluid medium 50 to flow from the rotatable spool 12 through spool pressure aperture 52 and communicating through the piston 14 via piston pressure aperture 54, into the lower chamber 44 (as depicted by directional flow indicator arrows not numbered so to differentiate non-flow and lead-line arrows). It is to be noted, the spool pressure port 48 is enclosed within the body of the spool 12, via rifle bore or similar method, and is not an annular passageway formed by a groove or other means between the outer diameter of the spool 12 and the inner diameter of the piston 14. Simultaneously, upper chamber 40 communicates through piston return aperture(s) 56 and spool return aperture(s) 58 to release low-pressure fluid medium 50 from within upper chamber 40 into the spool central return port 60 and back to the power medium source (not shown, but known to those experienced in the art). The rotation of spool 12 is timed or synchronized to open and close the spool pressure aperture 52 and piston pressure aperture 54 and the spool return aperture(s) 58 and piston return aperture(s) 56, respectively, such that the introduction of pressurized fluid medium 50 into the lower chamber 44 is simultaneous, or nearly so, with the evacuation of the upper chamber 44. The pressurized flow of the fluid medium 50 into lower chamber 44 taken together with the evacuation of fluid medium 50 from upper chamber 40, forces the cylinder 16 downward and thus spool bulkhead 22 downward in the direction depicted by Arrow D.

The spool return aperture(s) 58 and piston return aperture(s) 56 are located, positioned through their respective spool 12 and piston 14 member bodies such that the discharge into the central return port 60 of the spool 12 within 1.5 times the internal diameter of the central spool return port 60 centered on the midpoint 62 of the shoulder 32. Further, spool return aperture(s) 58 and piston return aperture(s) 56 are angled within the respective spool 12 and piston 14 member bodies such that the discharge is directed towards the central spool return port 60 and the midpoint 62 of the shoulder 32.

As discussed above regarding the FIG. 1, the base of the spool 12 remains unchanged. It is fitted with a base plug member 24 fixedly attached to the spool 12 at plug anchorage 64 by threaded or any other suitable connection. In another exemplary embodiment, the base plug member 24 may be fixedly attached to the spool bulkhead 22 or the piston 14. The spool base plug member 24 may feature a bull-nose tip 66 and one or more small diameter baffles 68 to permit the passage of fluid medium 50 pressure waves and/or flow (as a result of fluid medium 50 compression within the interior of the body of the base plug member 24) to enter into a series of expanded cavities 70 within the body of the base plug member 24. The effect of the baffles 68 and cavities 70 is to dissipate both the stress waves and flow, thereby reducing or eliminating cavitation.

Figure 3:
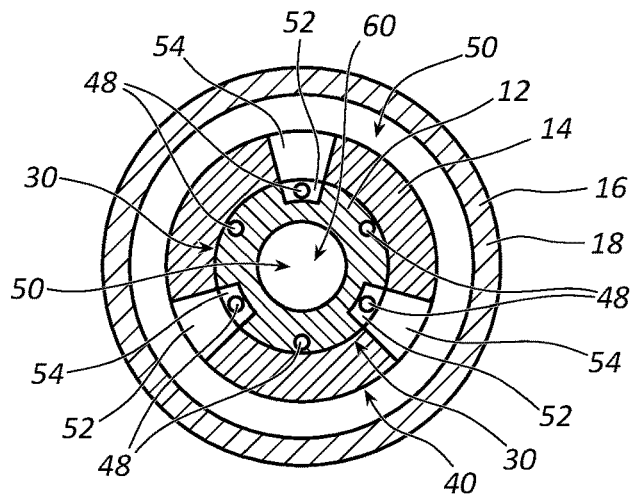
FIG. 3 depicts the exemplary embodiment of the linear actuator system of FIG. 1 showing a horizontal transverse section along line A-A through the upper cylinder chamber during the filling of the upper chamber, or first, upward movement cycle.

FIG. 3 depicts a horizontal plane cross-sectional view along line A-A of FIG. 1 of the exemplary linear actuator system 10 having a three-ported valve configuration. Line A-A passes through the upper chamber 40 when the spool 12 is in the position depicted. The configuration of this exemplary embodiment demonstrates the geometry of the spool valve 12 and piston 14 when spool pressure aperture 52 and piston pressure aperture 54 have been rotated into position for maximum communication. The spool 12 may rotate into the position shown which depicts full synchronization of the rotatable spool 12 and the fixed piston 14. The spool pressure port 48 is shown communicating pressurized medium flow 50 from the source to the upper chamber 40 of the linear actuator 10 to pressurize and enlarge the volume of the upper chamber 40.

It should be understood that the linear actuator system 10 of the present invention may have other configurations without departing from the spirit of the invention. For example, two-ported, four-ported, up to n-ported valve configurations (where n is factor of 360) are possible depending on the size of the linear actuator system 10 and its component spool 12, piston 14 and cylinder 16 parts. Those skilled in the art, armed with this disclosure will readily understand how to make and use each multi-port configuration of the linear actuator system 10 depicted and/or described herein. Also, although for the purposes of this disclosure the exemplary embodiment depicted has the piston 14 attached fixedly to the backing mass 26, it should be understood that with only slight modification (easily performed by those skilled in the art armed with this disclosure) another exemplary embodiment may have the cylinder 16 attached fixedly to the backing mass 26 and any implement being connected to a slidably movable piston 14 disposed within the cylinder 16.

In the exemplary embodiment of the three-ported valve configuration depicted in FIG. 3, spool pressure ports 48 are disposed at 60-degree intervals clockwise from the spool pressure port 48 depicted in FIG. 1. Every other spool pressure port 48 is shown to communicated pressurized medium 50 flow from the source into the upper chamber 40 of the linear actuator 10 during the FIG. 3 depicted cycle. The cylinder 16 is translated upward (see Arrow D) when the spool 12 is so positioned. In this three-ported valve configuration, the linear actuator 10 will repeat a complete upward and downward cycle three times with each full revolution of the spool 12.

By rotating the spool 12 60 degrees clockwise into the next-cycle configuration, the spool pressure ports 48 will communicate pressurized medium 50 flow from the source to the lower chamber 44 of the linear actuator during the next cycle. The cylinder 16 is translated downward (see Arrow D in FIG. 2) when the spool 12 is so positioned.

Figure 4:
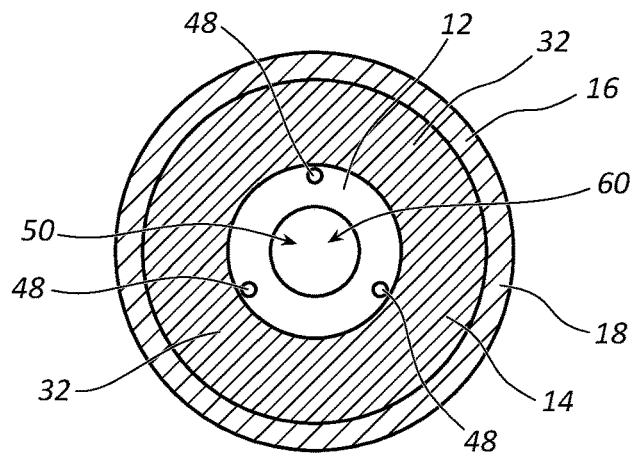
FIG. 4 depicts the exemplary embodiment of the linear actuator system of FIG. 1 showing a horizontal transverse section along line B-B through the center of the valve at the shoulder during the filling of the upper chamber, or first, upward movement cycle; but FIG. 4 also depicts a horizontal transverse section along line B-B of FIG. 2 through the center of the valve at the shoulder during the filling of the lower chamber, or downward movement cycle.

FIG. 4 depicts a horizontal plane cross-sectional view along line B-B of FIGS. 1 and 2 of the exemplary linear actuator system 10 at the center of the shoulder 32 when the spool 12 is in the position depicted in both FIGS. 1 and 2. Those skilled in the art will appreciate that the exemplary embodiment shows 1) an upward cycle configuration in FIG. 1 when the spool pressure ports 48 are positioned for activating the upper chamber 40 during the upward translation (see Arrow D in FIG. 1) of the cylinder 16, and 2) a downward cycle configuration in FIG. 2 when the spool pressure ports 48 are positioned for activating the lower chamber 44 during the downward translation (see Arrow D in FIG. 2) of the cylinder 16.

Figure 5:
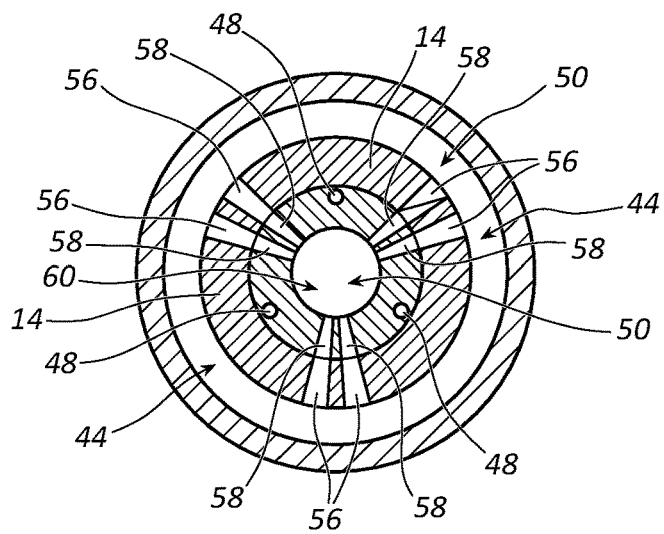
FIG. 5 depicts the exemplary embodiment of the linear actuator system of FIG. 1 showing a horizontal transverse section along line C-C through the lower cylinder chamber during the filling of the upper chamber; and thus, the emptying of the lower cylinder chamber during the first, upward movement cycle.

FIG. 5 depicts a transverse along non-linear line C-C of FIG. 1 of the exemplary linear actuator 10 having a three-ported valve configuration. Line C-C passes through the lower chamber 44 when the spool 12 is in the position depicted. The configuration of this exemplary embodiment demonstrates the geometry of the spool valve 12 and piston 14 when spool return aperture(s) 58 and piston return aperture(s) 56 have been rotated into position for maximum evacuation from lower chamber 44. It should be noted that non-linear line C-C passes at an angle through spool return aperture 58 and piston return aperture 56 so to depict the angled passageway through which low-pressure fluid medium 50 flows from the lower chamber into the spool central return port 60. The cylinder 16 is translated upward (see Arrow D of FIG. 1) when the spool 12 is so positioned.

For exemplary methods or processes of the invention, the sequence and/or arrangement of steps described herein are illustrative and not restrictive. Accordingly, although steps of various processes or methods may be shown and described as being in a sequence or temporal arrangement, the steps of any such processes or methods are not limited to being carried out in any specific sequence or arrangement, absent an indication otherwise. Indeed, the steps in such processes or methods generally may be carried out in different sequences and arrangements while still falling within the scope of the present invention.

Additionally, any references to advantages, benefits, unexpected results, preferred materials, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under Section 112 is not intended. Additionally, it is not intended that the scope of patent protection afforded the present invention be defined by reading into any claim a limitation found herein that does not explicitly appear in the claim itself.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A linear actuator system for delivering linear vibration to a working implement, the linear actuator system being connected to a device having a fluid-pressurizing source and a supporting housing or a dominant mass, the linear actuator system having a longitudinal axis and comprising:
   a piston, the piston having a piston body and a piston shoulder that defines a midpoint where the center-transverse plane of the piston shoulder intersects the longitudinal axis, the piston body having at least one piston pressure aperture and at least one piston return aperture angled toward the midpoint;
   a cylinder slidably engaging the piston to define an upper chamber and a lower chamber;
   a spool rotatably engaging the piston, the spool comprising:
      a spool body and a spool central return port;
      at least one spool pressure port;
      at least one spool pressure aperture, each spool pressure aperture being in fluidic communication with one spool pressure port; and
      at least one spool return aperture angled toward the midpoint;
   a fluid medium for circulation through the linear actuator system and the fluid-pressurizing source to cause vibratory movement of the cylinder relative to the piston between an upward cycle configuration and a downward cycle configuration as the spool is rotated;
   wherein the linear actuator system is in the upward cycle configuration when each spool pressure aperture aligns in fluidic communication with one piston pressure aperture and the fluid medium is introduced under pressure through the spool pressure port, into and through the spool pressure aperture and piston pressure aperture into the upper chamber while each piston return aperture aligns in fluidic communication with one spool return aperture and low-pressure fluid medium evacuates from the lower chamber through the piston return aperture and the spool return aperture into the spool central return port returning towards the midpoint to the fluid-pressurizing source; and
   wherein the linear actuator system is in the downward cycle configuration when each spool pressure aperture aligns in fluidic communication with one piston pressure aperture and the fluid medium is introduced under pressure through the spool pressure port, into and through the spool pressure aperture and piston pressure aperture into the lower chamber while each piston return aperture aligns in fluidic communication with one spool return aperture and low-pressure fluid medium evacuates from the upper chamber through the piston return aperture and the spool return aperture into the spool central return port returning to the fluid-pressurizing source.

2. The linear actuator system of claim 1 wherein the piston is connected fixedly to at least one of the supporting housing and the dominant mass and the cylinder translates vibration to the working implement.

3. The linear actuator system of claim 1 wherein the cylinder is connected fixedly to at least one of the supporting housing and the dominant mass and the piston translates vibration to the working implement.

4. The linear actuator system of claim 1 further comprises a three-ported valve configuration wherein the linear actuator system changes from the upward cycle configuration to the downward cycle configuration by rotating the spool sixty degrees relative to the piston.

5. The linear actuator system of claim 1 further comprises a three-ported valve configuration wherein the linear actuator system changes from the downward cycle configuration to the upward cycle configuration by rotating the spool sixty degrees relative to the piston.

6. The linear actuator system of claim 1 wherein the spool central return port has a diameter and the low-pressure fluid medium enters the spool central return port from the piston return aperture at an axial distance about 1.5 times the diameter from the midpoint.

7. The linear actuator system of claim 1 further comprising a base plug member fixedly disposed within the spool central return port proximate to a spool bulkhead.

8. The linear actuator system of claim 7 wherein the base plug member further comprises one or more features selected from a group of features consisting of a bull-nose tip, a baffle, and a cavity within the base plug member.

9. The linear actuator system of claim 6 further comprising a base plug member fixedly disposed within the spool central return port proximate to a spool bulkhead.

10. The linear actuator system of claim 9 wherein the base plug member further comprises one or more features selected from a group of features consisting of a bull-nose tip, a baffle, and a cavity within the base plug member.

11. The linear actuator system of claim 1 further comprising an annual gap between the spool and the piston, the gap having a length and width sufficient to cause a non-leaking seal.

12. A linear actuator system for reducing cavitation effects and delivering linear vibration to a working implement, the linear actuator system being connected to a device having a fluid-pressurizing source and a supporting housing or a dominant mass, the linear actuator system having a longitudinal axis comprising:
  a three-ported valve configuration;
  a piston, the piston having a piston body and a shoulder that defines a midpoint where the center-transverse plane of the shoulder intersects the longitudinal axis, the piston body having at least six piston pressure apertures and at least six piston return apertures each angled toward the midpoint;
  a cylinder slidably engaging the piston to define an upper chamber and a lower chamber;
  a spool rotatably engaging the piston, the spool comprising:
    a spool body and a spool central return port;
    six spool pressure ports;
    at least six spool pressure apertures, each spool pressure aperture being in fluidic communication with one spool pressure port; and
    at least six spool return apertures angled toward the midpoint;
  a fluid medium for circulation through the linear actuator system and the fluid-pressurizing source to cause vibratory movement of the cylinder relative to the piston between an upward cycle configuration and a downward cycle configuration as the spool is rotated;
  a base plug member fixedly disposed within the spool central return port proximate to a spool bulkhead, the base plug member comprising a bull-nose tip.
  wherein the linear actuator system is in the upward cycle configuration when each spool pressure aperture aligns in fluidic communication with one piston pressure aperture and the fluid medium is introduced under pressure through the spool pressure port, into and through the spool pressure aperture and piston pressure aperture into the upper chamber while each piston return aperture aligns in fluidic communication with one spool return aperture and low-pressure fluid medium evacuates from the lower chamber through the piston return aperture and the spool return aperture into the spool central return port returning towards the midpoint to the fluid-pressurizing source; and
  wherein the linear actuator system is in the downward cycle configuration when each spool pressure aperture aligns in fluidic communication with one piston pressure aperture and the fluid medium is introduced under pressure through the spool pressure port, into and through the spool pressure aperture and piston pressure aperture into the lower chamber while each piston return aperture aligns in fluidic communication with one spool return aperture and low-pressure fluid medium evacuates from the upper chamber through the piston return aperture and the spool return aperture into the spool central return port returning to the fluid-pressurizing source.

13. The linear actuator system of claim 12 wherein the piston is connected fixedly to at least one of the supporting housing and the dominant mass and the cylinder translates vibration to the working implement.

14. The linear actuator system of claim 12 wherein the cylinder is connected fixedly to at least one of the supporting housing and the dominant mass and the piston translates vibration to the working implement.

15. The linear actuator system of claim 12 wherein the linear actuator system changes from the upward cycle configuration to the downward cycle configuration by rotating the spool sixty degrees relative to the piston.

16. The linear actuator system of claim 12 wherein the linear actuator system changes from the downward cycle configuration to the upward cycle configuration by rotating the spool sixty degrees relative to the piston.

17. The linear actuator system of claim 12 wherein the spool central return port has a diameter and the low-pressure fluid medium enters the spool central return port from the piston return aperture at an axial distance about 1.5 times the diameter from the midpoint.

18. The linear actuator system of claim 12 wherein the base plug member further comprises at least one internal baffle and at least one internal cavity.

19. A linear actuator system for reducing cavitation effects and delivering linear vibration to a working implement, the linear actuator system being connected to a device having a fluid-pressurizing source and a supporting housing or a dominant mass, the linear actuator system having a longitudinal axis and comprising:
  a piston, the piston having a piston body;
  a shoulder that defines a midpoint where the center-transverse plane of the shoulder intersects the longitudinal axis;
  a cylinder slidably engaging the piston, the cylinder, piston and shoulder define an upper chamber and a lower chamber separated by the shoulder, the piston body having at least one piston pressure aperture communicating with the upper chamber, at least one piston pressure aperture communicating with the lower chamber, at least one piston return aperture angled from the upper chamber toward the midpoint, and at least one piston return aperture angled from the lower chamber toward the midpoint;
  a spool rotatably engaging the piston and defining a gap that forms a seal between the piston and the spool, the spool comprising:
    a spool body and a spool central return port;
    at least one spool pressure port;
    at least one spool pressure aperture, each spool pressure aperture being in fluidic communication with one spool pressure port; and
    at least one spool return aperture angled toward the midpoint;

a fluid medium for circulation through the linear actuator system and the fluid-pressurizing source to cause vibratory movement of the cylinder relative to the piston between an upward cycle configuration and a downward cycle configuration as the spool is rotated;

a base plug member fixedly disposed within the spool central return port proximate to a spool bulkhead, the base plug comprising a bull-nose tip, at least one internal baffle, and at least one internal cavity;

wherein the piston is connected fixedly to at least one of the supporting housing and the dominant mass and the cylinder translates vibration to the working implement;

wherein the linear actuator system is in the upward cycle configuration when each spool pressure aperture aligns in fluidic communication with one piston pressure aperture and the fluid medium is introduced under pressure through the spool pressure port, into and through the spool pressure aperture and piston pressure aperture into the upper chamber while each piston return aperture aligns in fluidic communication with one spool return aperture and low-pressure fluid medium evacuates from the lower chamber through the piston return aperture and the spool return aperture into the spool central return port returning towards the midpoint to the fluid-pressurizing source;

wherein the linear actuator system is in the downward cycle configuration when each spool pressure aperture aligns in fluidic communication with one piston pressure aperture and the fluid medium is introduced under pressure through the spool pressure port, into and through the spool pressure aperture and piston pressure aperture into the lower chamber while each piston return aperture aligns in fluidic communication with one spool return aperture and low-pressure fluid medium evacuates from the upper chamber through the piston return aperture and the spool return aperture into the spool central return port returning to the fluid-pressurizing source; and wherein the spool central return port has a diameter and the low-pressure fluid medium enters the spool central return port from the piston return aperture at an axial distance about 1.5 times the diameter from the midpoint.

20. The linear actuator system of claim 19 further comprises a three-ported valve configuration wherein the linear actuator system changes from the upward cycle configuration to the downward cycle configuration by rotating the spool sixty degrees relative to the piston and wherein the linear actuator system changes from the downward cycle configuration to the upward cycle configuration by rotating the spool sixty degrees relative to the piston.

* * * * *